Nov. 26, 1940.  E. TYDEN  2,223,137

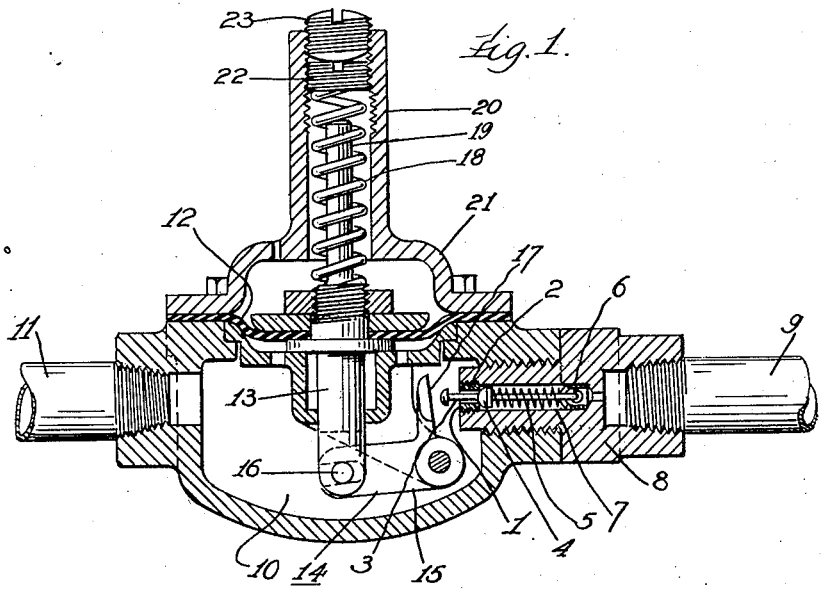

DIFFERENTIAL OPERATED CHECK VALVE

Filed June 19, 1939  2 Sheets-Sheet 2

Inventor
Emil Tyden
by [signature]
his Attorneys

Patented Nov. 26, 1940

2,223,137

UNITED STATES PATENT OFFICE 2,223,137

DIFFERENTIAL OPERATED CHECK VALVE

Emil Tyden, Hastings, Mich.

Application June 19, 1939, Serial No. 279,829

7 Claims. (Cl. 137—153)

This invention relates to improvements in check valves, particularly those designed for holding air or gas pressure, and one object of the invention is to increase the reliability of such valves as pressure-retaining devices. Another object is to provide means for mechanically operating a check valve by means of a supply or inlet pressure only slightly greater than that of the outlet pressure retained by the valve. Another object is to provide mechanical means for operating a check valve which shall insure the passage of air or the gas in one direction only. A further object is to provide a check valve with mechanical means for operating the same controlled by the pressure which the valve retains. The invention consists in certain features and elements of construction in combination, as herein shown and described and as indicated by the claims.

In the drawings:

Fig. 1 is an axial sectional view showing a check valve embodying this invention with mechanical means for operating the same controlled by the inlet or supply pressure.

Fig. 2 is a similar axial section showing a modification in which the mechanical operating mechanism also assists in holding the valve seated.

Figure 3:
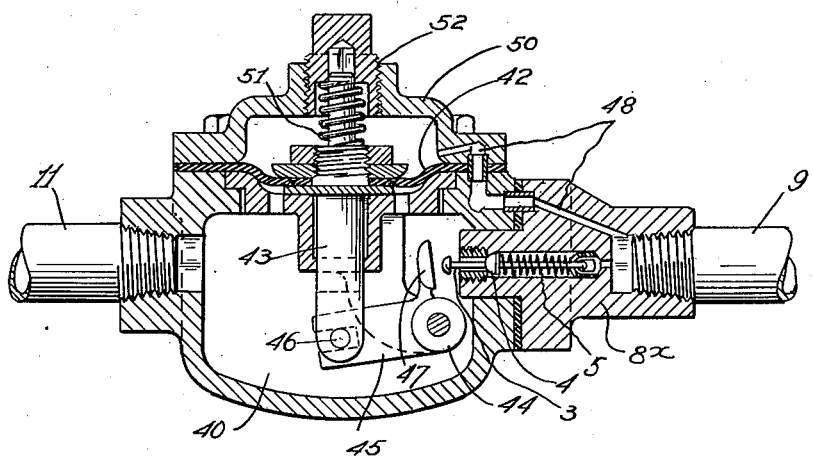
Fig. 3 is an axial sectional view of a further modification in which the operation of the mechanical device which opens the check valve is under the control of the pressure which the valve serves to retain.

Where a quantity of air or other gas under pressure is separated from a source of supply only by a simple check valve, it is frequently found that such a valve is unreliable for insuring the maintenance of pressure as intended. If the valve is comparatively sensitive, so that the supply pressure need be only slightly greater than the retained pressure in order to open the valve and restore an equalization of pressures on both sides, then the very fact of such equalization leaves the valve seated with very little pressure and therefore somewhat uncertainly seated, so that if the supply is gradually diminished there may be a slow leakage past the valve, with the result that the supposedly retained pressure is also lowered. If, to overcome this tendency, the check valve is more firmly seated by means of a spring, and is designed so that there is a considerable differential as between the retained pressure which tends to seat the valve and the inlet pressure which tends to open it, then the supply pressure must always be considerably higher than the retained pressure in order to be able to open the valve for replenishing the air in the system beyond the valve.

The drawings show a valve of the Schrader type, which is similar to those commonly used for holding air in automobile and bicycle tires, and which includes a seat member, 1, having a relatively small orifice, 2, through which there extends a stem, 3, carrying a valve member 4. The latter is usually composed of rubber or like material, backed up by a metallic flange on the stem, and normally held seated by a spring, 5, reacting against a stop member, 6, which is lodged in the end of the bore, 7, which accommodates the valve structure. As shown, this bore, 7, is formed in an outlet fitting, 8, to which is connected an outlet pipe, 9, leading to the receptacle, apparatus or mechanism in which it is desired to retain a given pressure of air or gas. This fitting, 8, is shown connected into a chamber, 10, to which an inlet pipe, 11, leads from a source of supply. The relatively small orifice, 2, exposes to the inlet or supply pressure a considerably smaller area of the valve, 4, than is exposed to the pressure from the pipe, 9, and since, in addition to the latter, there is the force of spring, 5, tending to hold the valve seated, the air supplied to the pipe, 11, would have to attain a much higher pressure than the air in the pipe, 9, before it could open the valve, 4.

However, under conditions in which it is desirable to keep the pressure in the pipe, 9, as nearly equal as possible to the supply pressure in the pipe, 11, that is, within a few pounds of it, the mechanism embodying this invention will render this feasible. At one side of the chamber, 10, there is mounted a flexible diaphragm, 12, which constitutes, in effect, one wall of the chamber, 10. The chamber and this flexible wall, 12, are at all times subject to the pressure supplied through the inlet pipe, 11. The diaphragm has connected to it a stem, 13, and a bell crank lever, 14, whose longer arm, 15, is engaged with the pin, 16, in the end of the stem, 13, and whose shorter arm, 17, extends adjacent the projecting end of the valve stem, 3, but normally out of contact therewith. Air or gas pressure in the chamber, 10, tends to move the diaphragm, 12, outwardly in a direction to lift the stem, 13, and rock the bell crank lever, 14, so that its shorter arm, 17, contacts the valve stem, 3, and depresses it, opening the valve, 4. This action may be arranged to occur at any desired inlet pressure and independently of the outlet pressure in the pipe, 9, because the area of the diaphragm, 12, is so much greater than the area of the valve, 4, that the total pressure which can be applied to the diaphragm and multiplied through the bell crank lever, 14, is greatly in excess of any holding pressure which the air or gas in pipe, 9, can exert against the valve; and it will also considerably exceed the effective pressure of the spring, 5.

For adjusting the diaphragm, 12, and its mechanism to respond to a particular pressure, a spring, 18, is coiled about a reduced section of the stem, 19, extending outwardly from the diaphragm, 12, and housed in a cylindrical extension, 20, of the cap, 21, which encloses the diaphragm at its outer side. The extension, 20, carries an adjusting set screw, 22, against which the spring, 18, reacts, and a locking screw, 23, for holding screw, 22, at adjusted position. Thus a portion of the inlet pressure in the chamber, 10, may be counteracted by the spring, 18. But when the pressure in the chamber, 10, becomes slightly more than sufficient to overcome the spring, 18, and force the diaphragm, 12, upwardly, it will operate the bell crank, 14, to open the valve, 4, and admit additional air to the pipe, 9, and apparatus connected thereto. Thus the pipe, 9, will be connected with the supply pressure whenever that pressure reaches or exceeds a predetermined value, and as soon as the supply pressure drops below such value the diaphragm, 12, will return to its original position under the influence of spring, 18; and the bell crank arm, 17, being withdrawn from the stem of the valve, 4, the latter will close under the influence of the pressure and its own spring, 5, and will serve effectively to retain the pressure thus trapped.

Fig. 2 shows a structure similar to Fig. 1, in all respects except that the stem, 30, of the valve, 4, is extended through an opening in the arm, 17, of the bell crank, 14, and carries a light spring, 31, on its extended end portion reacting between this arm of the bell crank and the stop flange, 32, on the end of the stem. This insures seating of the valve, 4, when the arm, 17, swings away from it. When the arm is operated in the opposite direction by the diaphragm, 12, it encounters a flange, 33, on the stem, 30, and operates to open the valve in the manner already described with respect to Fig. 1.

Fig. 3 shows a structure which resembles those of Figs. 1 and 2 in most respects, but which operates somewhat differently. The supply line, 11, and the outlet pipe, 9, are connected into a chamber, 40, having a diaphragm, 42, whose stem, 43, is connected to a bell crank, 44. The longer arm, 45, of the bell crank is connected by a pin, 46, to the stem, 43, and the shorter arm, 47, is arranged for opening the valve, 4, by contact with its stem, 3. The inlet pressure operates against the side of the diaphragm, 42, which is toward the chamber, 40, but the opposite side of the diaphragm within the cap, 50, is exposed to the pressure in the pipe, 9, which reaches the diaphragm through a by-pass, 48, formed in the fitting, 8×, and in the casting which contains the chamber, 40, and in the flange of the cap, 50. Supplementing the pressure applied through the pipe, 9, the spring, 51, is disposed between the diaphragm and the threaded head, 52, in the cap, 50. Thus the pressure at which the valve, 4, will be opened may be determined in advance by regulating the pressure of the spring, 51, and if this spring pressure be made very light, it will be evident that air will be admitted through the valve, 4, whenever the pressure in the pipe, 9, and its connected apparatus drops only a little below the inlet pressure at 11, so that the inlet pressure can overcome it and shift the diaphragm, 12, and its connected bell crank lever, 44.

This arrangement thus provides that when the retained pressure at 9 falls below a certain predetermined value it will be promptly replenished from the supply pipe, 11, assuming, of course, that the supply pressure has been maintained at a proper value. And while the spring, 5, will ensure firm seating of the valve, 4, and effective retention of the pressure at 9, the provision of the diaphragm, 42, and its connected mechanism allows the valve to be opened by a much smaller pressure differential as between outlet and supply pressures than would be sufficient to open the valve, 4, against its spring, 5.

Figure 4:
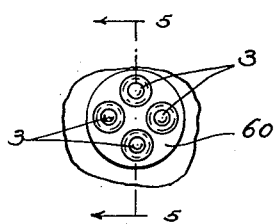
Fig. 4 is a face view of a multiple valve constructed in accordance with this invention.
Figure 5:
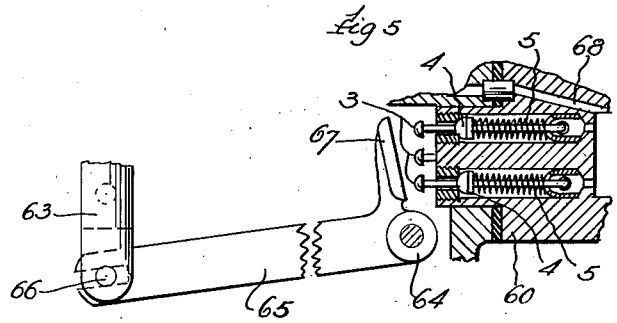
Fig. 5 is a vertical section taken substantially as indicated at line 5—5 on Fig. 4, and showing an elongated lever for actuating the multiple valves.

Figs. 4 and 5 illustrate the employment of multiple valves of the type shown in Figs. 1, 2 and 3 so as to afford larger capacity without altering the essential valve details. Several of these valves, 4, may be mounted in a single fitting, 60, with their projecting stems, 3, disposed substantially in a common plane and extending into the chamber which is subject to the inlet pressure. A suitable diaphragm, not shown, will be arranged to actuate a stem or plunger, 63, and a bell crank lever, 64, may have a relatively long arm, 65, connected to the plunger as by a pivot, 66, and a relatively short arm, 67, arranged to contact simultaneously with all the valve stems, 3, for depressing them when the diaphragm is actuated by the inlet pressure. The arm, 65, will be made of any suitable length for multiplying the effective forces for simultaneously compressing the several valve springs, 5, instead of a single spring, as in the structures previously described.

In each of the forms of the invention herein shown it will be noted that when the valve, 4, is in closed position the head of its stem, 3, (or in Fig. 2, the flange, 33, on the stem) stands at some distance from the operating lever arm of the bell crank. This permits small or sudden fluctuations of pressure in the chamber to take place, and even to move the diaphragm slightly without, in any way, affecting the valve, 4; hence, there is no tendency for the valve to "flutter" on its seat, since its spring, 5, is ample to hold it firmly seated in opposition to these minor fluctuations of pressure, in so far as they act only through the air and directly upon the valve itself.

While there is shown and described herein certain specific structure embodying the invention, it will be manifest to those skilled in the art that various modifications and re-arrangements of the parts may be made without departing from the spirit and scope of the invention, and that the same is not limited to the particular form herein shown and described, except in so far as indicated by the appended claims.

I claim:
1. A check valve device comprising a chamber having an inlet and an outlet, an automatic check valve in the outlet controlling a relatively small port and seating toward the chamber, a relatively large flexible diaphragm subject to the pressure in the chamber supplied through its inlet, mechanism normally disengaged from the check valve but connected to said diaphragm and operable thereby in a direction to engage and open said valve in response to the inlet pressure, and yielding means opposing said diaphragm for determining the pressure at which said mechanism will be operated.

2. A check valve device comprising a chamber having an inlet and an outlet, an automatic check valve in the outlet controlling a relatively small port and seating toward the chamber, said valve having a stem projecting into the chamber and a spring urging the valve to its seat, a relatively large flexible diaphragm subject to the pressure in the chamber supplied through its inlet, a lever coupled to said diaphragm with one arm disposed to engage said valve stem but normally spaced therefrom, said lever being actuated by pressure in the chamber in a direction for opening the valve, and yielding means positioned to oppose such movement of the lever and operating to prevent opening of the valve until the pressure in the chamber is sufficient to overcome the opposition of said yielding means.

3. A check valve device comprising a chamber having an inlet and an outlet, an automatic check valve in the outlet seating toward the chamber, a flexible diaphragm subject to the pressure in the chamber supplied through its inlet, mechanism normally disengaged from the check valve but connected to said diaphragm and operable in a direction to engage and open said valve in response to the inlet pressure, and adjustable yielding means opposing said diaphragm for determining the pressure at which said mechanism will be operated.

4. A check valve device comprising a chamber having an inlet and an outlet, an automatic check valve in the outlet controlling a relatively small port and seating toward the chamber, said chamber having a movable wall subject to the pressure in the chamber supplied through its inlet, mechanism normally disengaged from the check valve but connected to said movable wall and operable thereby in a direction to engage and open said valve in response to the inlet pressure, and adjustable yielding means opposing movement of said wall for determining the pressure at which said mechanism will be operated.

5. A check valve device comprising a chamber having an inlet and an outlet, an automatic check valve in the outlet seating toward the chamber, said chamber having a movable wall subject on one side to the pressure in the chamber supplied through the inlet and subject on the other side to the pressure at the outlet beyond said valve, and mechanism normally disengaged from the check valve but connected to said movable wall and operable thereby in a direction to engage and open said valve when the inlet pressure against said wall overcomes the pressure on the opposite side of the wall.

6. A check valve device comprising a chamber having an inlet and an outlet, an automatic check valve in the outlet seating toward the chamber, a flexible diaphragm subject on one side to the pressure in the chamber supplied through the inlet and subject on the other side to the pressure at the outlet beyond said valve, and mechanism normally disengaged from the check valve but connected to said diaphragm and operable thereby in a direction to engage and open said valve when the inlet pressure against the diaphragm overcomes the pressure on the opposite side of said diaphragm.

7. A check valve device comprising two chambers with a flexible diaphragm between them, one chamber having an inlet and an outlet, an automatic spring-seated check valve in the outlet seating toward the chamber, a by-pass affording communication between the other chamber and a point in the outlet beyond said valve, and mechanism normally disengaged from the check valve but operable by said diaphragm in a direction to engage and open said valve when the diaphragm is flexed toward said other chamber, together with a spring opposing such flexure of the diaphragm and means for adjusting the strength of said spring.

EMIL TYDEN.